Aug. 10, 1943.　　　　J. R. HILL　　　　2,326,537
STORAGE BATTERY
Original Filed April 29, 1940

INVENTOR.
JAMES R. HILL
BY Kwis Hudson & Kent
ATTORNEYS

Patented Aug. 10, 1943

2,326,537

UNITED STATES PATENT OFFICE 2,326,537

STORAGE BATTERY

James R. Hill, Cleveland Heights, Ohio, assignor to Willard Storage Battery Company, Cleveland, Ohio, a corporation of West Virginia Original application April 29, 1940, Serial No. 332,180, now Patent No. 2,287,802, dated June 30, 1942. Divided and this application December 11, 1941, Serial No. 422,527

1 Claim. (Cl. 136—134)

This invention relates to storage batteries and provides an improved construction therefor in which slotted insulating strips underlie the plate-connecting straps and extend between such straps and the plates of opposite polarity.

Another object of the invention is to provide an improved storage battery construction in which an insulating strip applied to the lugs of a group of battery plates of one polarity extends transversely of the plates beneath the connecting strap of that plate group and insulates such strap from accidental short-circuiting contact with adjacent portions of the plates of opposite polarity.

Other objects and advantages of my invention will be apparent from the following description when taken in conjunction with the accompanying sheet of drawings, in which.

This application is a division of my original application, Serial No. 332,180, filed April 29, 1940, now Patent No. 2,287,802 granted June 30, 1942.

Further reference will now be made to the accompanying drawing for the purpose of describing my improved battery construction more in detail, but notwithstanding such detailed description, it will be understood, of course, that my invention includes all similar constructions and variations coming within the scope of the appended claim.

Before proceeding with the detailed description of my improved battery construction, it might be explained in a general way that my invention contemplates the use of a slotted insulating strip formed of paper or other appropriate material which is applied to the lugs of one or both groups of positive and negative battery plates contained in a battery element. As will be explained more in detail hereinafter, this insulating strip extends between the strap connecting the plates of one polarity and the tops of the plates of the opposite polarity and prevents accidental short-circuiting engagement between such plates and strap. As explained in said original application, this insulating strip also serves a very useful purpose in the work of assembling the parts of the battery, in that it serves to hold the plates in properly spaced relation for lead-burning a connecting strap to the lugs; it shields the plates from the heat of the lead-burning operation; and it also prevents particles of lead from dropping down between the plates. This insulating strip, as explained in said original application, can also be used with a lead-burning form in which it not only holds the plates in properly spaced relation but forms a closure for the opening of the form in which the strap is received for the lead-burning operation.

Figure 1:
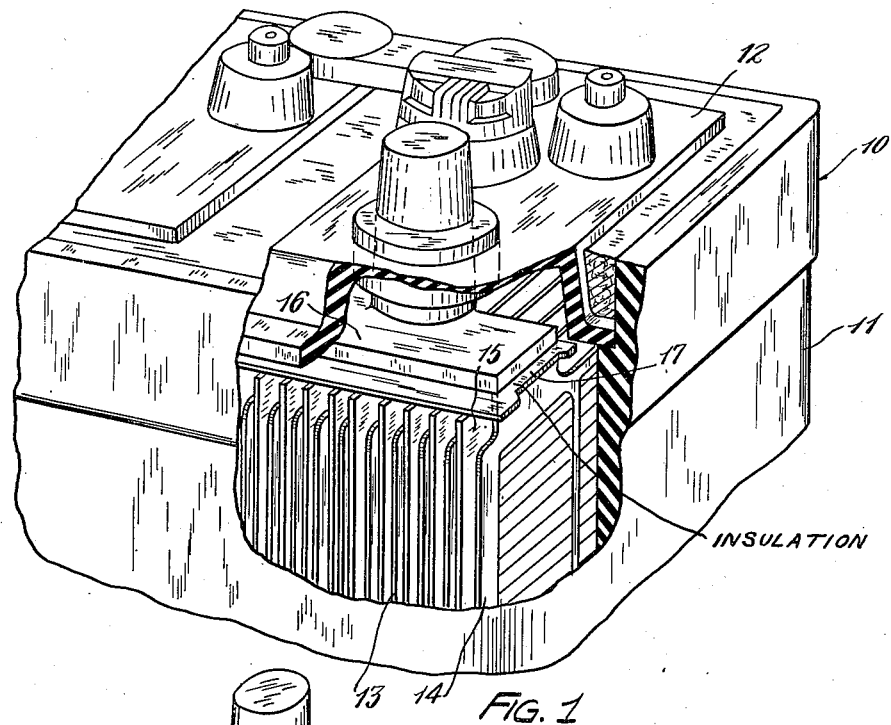
Fig. 1 is a perspective view of a storage battery embodying my improved construction and showing the battery with portions thereof broken away.

In Fig. 1 I show a storage battery 10 comprising a container 11 having a plurality of cells or compartments provided with the usual covers 12 and containing battery elements formed of positive and negative plates 13 and 14 alternately arranged with insulating separators 15 between adjacent plates. The battery plates 13 and 14 are of the type having upstanding lugs projecting therefrom substantially in rows and connected by connecting straps 16 of the usual type lead-burned thereto. The positive and negative plates 13 and 14 of the battery 10 have my slotted insulating strip 17 applied to the lugs thereof, the insulating strip which is applied to the lugs of the negative plates 14 being visible in the battery as illustrated in Fig. 1. It will be understood, of course, that a similar insulating strip may be located in a corresponding position relative to the connecting strap of the positive plates 13 of the same cell.

Figure 3:
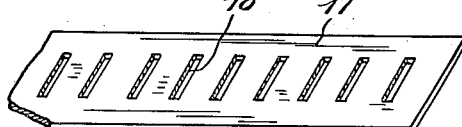
Fig. 3 is a perspective view showing a slotted insulating strip used in my improved battery construction.
Figure 4:
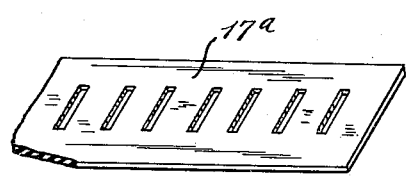
Fig. 4 is a similar view showing such a slotted insulating strip formed of rubber or equivalent moldable material.

The insulating strip 17 shown in detached relation in Fig. 3 may be formed of paper, cloth, fibre, latex, or various plastics or any other suitable material, and, as shown in the drawing, may comprise an elongated sheet or strip having a series of openings therethrough. Since the lugs of the battery plates are usually in the form of flat ears, the openings of the strip 17 are shown in the form of slots 18 extending transversely of the strip, although openings of any other desired shape could be used. Instead of employing an insulating strip formed of paper or other equivalent sheet material, I may use a similar slotted insulating strip formed of suitable moldable material, such as the hard rubber strip 17a shown in Fig. 4.

As shown in Fig. 1 of the drawing, the strip 17 extends transversely across the tops of the plates and separators and it underlies, and is substantially coextensive with, the connecting strap 16 to which the plates 14 are lead-burned. The lugs of the plates 14 extend through the slots of the strip 17 and are fused to the strap 16 by the lead-burning. In this position the strip 17 serves as an insulating means which will prevent short-circuiting in the event that jarring of the battery should cause the plates 13 to accidentally come into engagement with the under side of the strap 16.

Figure 2:
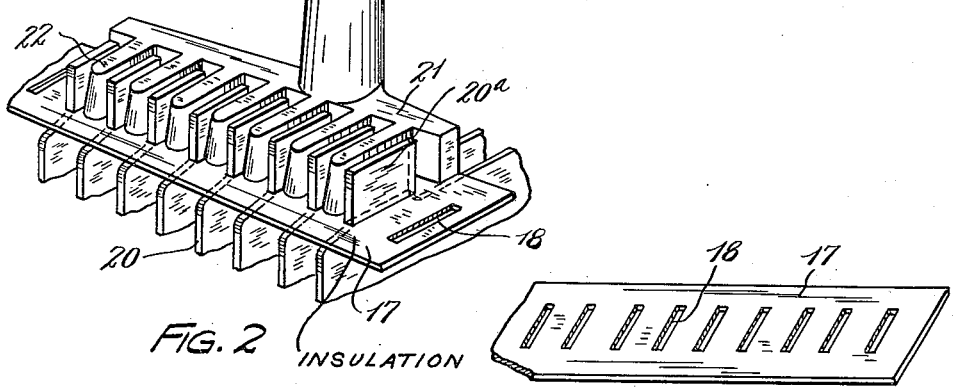
Fig. 2 is another perspective view illustrating my improved battery construction, the view showing a group of battery plates in position for lead-burning to a connecting strap with my slotted insulating strip underlying the strap.

To further illustrate the location and use of my insulating strip 17, I show such strip in Fig. 2 applied to the upstanding lugs of a group of spaced battery plates 20 and show a connecting strap 21 in position for lead-burning to the plates. The connecting strap has a comb portion comprising teeth 22 spaced and arranged to project between the pairs of lugs 20a of the plates 20. The connecting strap may rest on the strip 17, and during the lead-burning operation, the comb portion and the lugs of the plates are fused into a solid mass, such as that represented by the connecting strap 16 of the battery shown in Fig. 1.

From the foregoing description and the accompanying drawing, it will now be readily understood that I have provided an improved battery construction in which slotted insulating strips applied to the lugs of the plates underlie the plate-connecting straps and serve as an insulating means to prevent short-circuiting in the event that accidental contact should occur between the plates of one polarity and the connecting strap of the opposite polarity as the result of jarring of the battery or any other cause.

The use of the insulating strips 17 permits a more compact battery construction because the lugs 20a can be relatively short and the plates can be of full height with their tops close to the underside of the connectors and, because of the protection afforded by the strips, short circuits are not likely to occur.

While I have illustrated and described my improved battery construction in a more or less detailed manner, it will be understood, of course, that I do not wish to be limited to the particular details and arrangements herein disclosed, but regard my invention as including such changes and modifications as do not involve a departure from the spirit of the invention and the scope of the appended claim.

Having thus described my invention, I claim:

A storage battery comprising two sets of spaced plates arranged in alternate relation, each set of plates having a row of upstanding lugs thereon, a container for the plates, a cover for said container, connectors extending transversely of the plates below said cover and lead-burned to the lugs of the respective sets, said lugs being relatively short and the tops of said plates being close to the underside of said connectors, and two flexible insulating strips each underlying one of said connectors and having slots through which said lugs extend, each insulating strip lying on the tops of the plates of one set and serving to shield its connector from short-circuiting engagement by the tops of the plates of the other set.

JAMES R. HILL.